US 6,904,524 B1

(12) United States Patent
Jaeger, Jr. et al.

(10) Patent No.: US 6,904,524 B1
(45) Date of Patent: Jun. 7, 2005

(54) METHOD AND APPARATUS FOR PROVIDING HUMAN READABLE SIGNATURE WITH DIGITAL SIGNATURE

(75) Inventors: William L. Jaeger, Jr., Fairfax, VA (US); M. Greg Shanton, Centrevile, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/468,851

(22) Filed: Dec. 21, 1999

(51) Int. Cl.[7] .............................. H04L 9/00; H04K 1/00; G06K 9/00
(52) U.S. Cl. ................. 713/176; 713/170; 713/179; 713/182; 713/186; 380/30; 382/115
(58) Field of Search ................. 713/170, 176, 713/179, 182, 157; 380/30; 382/115, 119

(56) References Cited

U.S. PATENT DOCUMENTS

| | | | | |
|---|---|---|---|---|
| 5,544,255 A | * | 8/1996 | Smithies et al. | 382/119 |
| 5,781,635 A | * | 7/1998 | Chan | 380/30 |
| 5,883,956 A | * | 3/1999 | Le et al. | 713/170 |
| 5,926,550 A | * | 7/1999 | Davis | 713/176 |
| 6,064,751 A |   | 5/2000 | Smithies et al. | 382/115 |
| 6,192,142 B1 | * | 2/2001 | Pare et al. | 382/115 |
| 6,310,966 B1 | * | 10/2001 | Dulude et al. | 382/115 |
| 6,401,206 B1 | * | 6/2002 | Khan et al. | 713/176 |

FOREIGN PATENT DOCUMENTS

WO    WO 00/62140    10/2000

* cited by examiner

Primary Examiner—Gilberto Barrón
Assistant Examiner—A. Nobahar
(74) Attorney, Agent, or Firm—Staas & Halsey LLP

(57) ABSTRACT

Using know methods a digital signature, such as a one-way hash, of a document is produced. A digital representation of a signature is associated with the digital signature. The digital representation may be, for example, a digitized picture of the signature. Both the digital signature and the digital representation of the signature are sent to a recipient. The recipient may then view the digital representation of the signature and provide visual confirmation of the authenticity of the signature. In addition, the digital representation of the signature may be electronically analyzed to determine a match. The digital representation of the signature may then be shown to the recipient when the electronic analysis indicates an authentically signed document so as to provide a visual assurance of integrity.

8 Claims, 6 Drawing Sheets

METHOD AND APPARATUS FOR PROVIDING HUMAN READABLE SIGNATURE WITH DIGITAL SIGNATURE

BACKGROUND OF THE INVENTION

The present invention relates to method and apparatus for conducting an exchange of messages on a computer network using a digital signature in conjunction with a human readable signature.

SUMMARY OF THE INVENTION

Apparatus and method for visually digitally signing a document are discussed in detail hereinbelow. Using known methods a digital signature of a document is produced. For example such a digital signature may be provided using a one-way hash function on the contents of the document to produce a unique number based on the document. The digital signature is typically encoded using a private key of a sender. A digital representation of a signature of the sender, for example a digitized picture of the signature, is associated with the digital signature. Both the digital signature and the digital representation of signature are sent to a recipient. The recipient may then view the digital representation of the signature and provide visual confirmation that the digital representation does represent the signature of the sender. In addition, the digital representation of the signature may be electronically analyzed to determine a match. Display of the digital representation of the signature may also be shown to the recipient only when the electronic analysis indicates an authentically signed document so as to provide a visual assurance of integrity.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
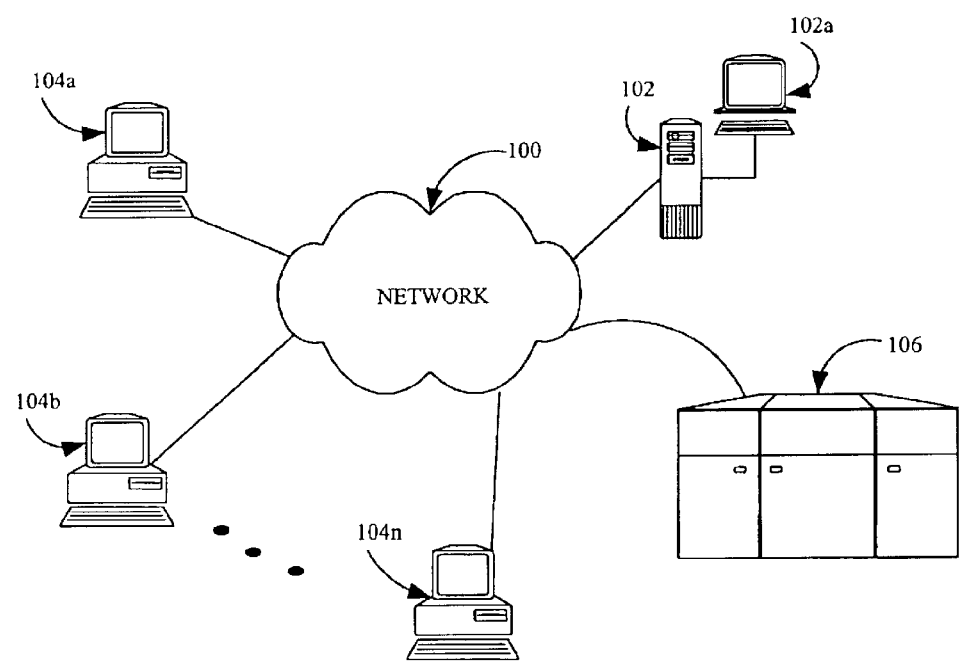
FIG. 1 is a block diagram of a computer system in accordance with a preferred embodiment of the present invention.

Reference will now be made in detail to the present preferred embodiments of the present invention, examples of which are illustrated in the accompanying drawings, wherein like reference numerals refer to like elements throughout.

Lack of security is often cited as a major barrier to the growth of Internet communication and, in particular, e-commerce. A stable system of communication can only be built on the confidence that comes from knowing that messages are protected from tampering. Securing business communications between users over computer networks can be likened to an electronic equivalent of signing a letter and sealing it in an envelope. The signature proves authenticity and the sealed envelope provides confidentiality.

Cryptography ensures confidentiality by encrypting a message using a secret key in association with an algorithm. This produces a 'scrambled' version of the message that the recipient can decrypt, using the original key, to retrieve the contents. The key used must be kept secret between the two parties. The central problem in most cryptographic applications is managing these keys and keeping them secret. Public key cryptography solves this problem by replacing the secret key with a pair of keys, one private and one public. Information encrypted using the public key can only be retrieved using the complementary private key. With this system the public keys of all users can be published in open directories, facilitating communications between all parties.

Integrity can be ensured by using the public and private keys to create and verify 'digital signatures'. These can be appended to messages to authenticate the message and the sender. Digital signatures typically comprise an encrypted "digital fingerprint" of the document. The digital fingerprint is typically created using a one-way hash function on the contents of the document. The signing, i.e. encryption, is typically performed by encrypting the output of the one-way hash (also called a message digest) with the sender's private key. The signature is then decrypted using the public key of the sender. The document is then submitted to the hash function. If the resulting hash of this process matches the hash included with the digital signature, then the document has not been manipulated, thereby proving the integrity of the document. During transmission, the document itself may or may not be encrypted.

But public key cryptography, on its own, is not enough if we are to truly re-create the the feel of traditional paper-based communication in an electronic world. A Public Key Infrastructure (PKI) has been proposed which provides a core framework for a wide variety of components, applications, policies and practices to combine and achieve the four characteristics. The proposed Public Key Infrastructure is a combination of hardware and software products, policies and procedures providing the basic security required for communication so that users, who do not know each other, or are widely distributed, can communicate securely through a chain of trust. Thus PKI provides for authentication. PKI is based on digital IDs known as 'digital certificates' which act like 'electronic passports', and validates and binds the user's identity to his or her public key.

Digital certificates allow verification of the claim that a specific public key does in fact belong to a specific individual. Digital certificates help prevent someone from using a phony key to impersonate someone else. In many cases it may be necessary to create a chain of certificates, each one certifying the previous one until the parties involved are confident in the identity in question. In their simplest form, digital certificates contain a public key user information, which can include a name, and third party validation.

As noted above these various devices are, in essence trying to replicate the apparent security of a signed and sealed letter. Part of the psychological security that comes from a signed and sealed letter is the visual sense of security that comes from the actual signature. However, current methods do not provide the visual sense of security that an actual signature provides.

The present Inventors have invented methods and apparatus for utilizing a human readable signature in conjunction with digital signatures.

The detailed description which follows is presented in terms of programs and symbolic representations of operations of data bits within a computer memory, associated computer processors, networks, and network devices. These descriptions and representations are the means used by those skilled in the data processing art to effectively convey the substance of their work to others skilled in the art. A program is here, and generally, conceived to be a self-consistent sequence of steps or actions leading to a desired result. Thus, the term "program" is generally used to refer to a series of operations performed by a processor, be it a central processing unit of a computer, or a processing unit of a network device, and as such, encompasses such terms of art as "objects", "functions", "subroutines" and "procedures."

In general, the sequence of steps in the programs require physical manipulation of physical quantities. Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

In the present case, the programs and operations are machine operations to be performed in conjunction with other machines and possibly human operators. Useful machines for performing the operations of the present invention include general purpose digital computers, routers, firewalls, application servers, switches, PDA's, POS devices, telephony devices and other similar devices. In general, the present invention relates to method steps, software, and associated hardware including computer readable medium, configured to store and/or process electrical or other physical signals to generate other desired physical signals.

The apparatus set forth in the present application may be specifically constructed for the required purposes or it may comprise a general purpose computer or other network device selectively activated or reconfigured by a program stored in the computer. The procedures presented herein are not inherently related to any particular computer or other apparatus. In particular, various general purpose machines may be used with programs in accordance with the teachings herein, or it may prove more convenient to construct more specialized apparatus to perform the required method steps. In certain circumstances, when it is desirable that a piece of hardware possess certain characteristics, these characteristics are described more fully in the following text. The required structures for a variety of these machines may appear in the description given below. Machines which may perform the functions of the present invention include those manufactured by such companies as HEWLETT PACKARD, Inc., INTERNATIONAL BUSINESS MACHINES, Inc., and CISCO, Inc., as well as other manufacturers of computer systems and network devices.

With respect to the software described herein, those of ordinary skill in the art will recognize that there exists a variety of platforms and languages for creating software for performing the procedures outlined herein. Those of ordinary skill in the art also recognize that the choice of the exact platform and language is often dictated by the specifics of the actual system constructed, such that what may work for one type of general purpose computer may not be efficient on another type of general purpose computer. In practice, the present invention can be realized on any operating system, such as WINDOWS by MICROSOFT Corp. or MACOS by APPLE COMPUTER INC., utilizing a variety of development platforms including JAVA and any number of packages for the front end such as any number of Internet Browsers.

FIG. 1 is a block diagram of a computer system in accordance with a preferred embodiment of the present invention. The description that follows assumes a web or e-mail based environment. However, the present invention is not limited to such an environment. The system includes a server 102, typically accessed using a terminal 12a, and a plurality of user devices 104a, 104b . . . 104n connected via a network 100. Additionally, a system 106 may be accessed to provide additional services such as remote data storage and retrieval.

The server 102 may be either a general purpose computer, such as those based on the INTEL PENTIUM Microprocessor, or MOTOROLA POWER PC Series processors or a specific purpose computer such as any number of web or e-mail servers, or more powerful general purpose machines such as IBM's AS400 which can be highly customized. The server 102 can provide a variety of services, including web, e-mail, Internet access, and any number of e-commerce services such as certification.

In accordance with the preferred embodiment, the network 100 comprises the Internet, however, those of ordinary skill in the art will recognize that the present invention is also applicable to systems in which the network 100 is a LAN, a WAN, a public telephone system, a proprietary network, or even an Intranet. In fact, all that is required of a network 100 is that it be able to carry the type of information required by server 102 and the user devices 104a, 104b . . . 104n. It is noted that the network 100 may include a controller, such as a router (not shown), which facilitates communication between the server 102 and the user devices 104a, 104b . . . 104n.

The user devices 104a, 104b . . . 104n will typically comprise general computers such as those based on the INTEL PENTIUM Microprocessor or MOTOROLA POWER PC microprocessors, however the present invention is equally applicable to any number of devices, such as PDA's, kiosks, or cellular phones. The user device 104n may be a portable computer, such as a lap top computer, a palm-top computer, a hand-held computer, or a "PDA" (personal digital assistant). For example, the user device 104n may be a NINO 300N personal companion manufactured by PHILIPS ELECTRONICS NV, or an Infomobile Smart Phone manufactured by SAMSUNG ELECTRONICS, each of which utilizes the Windows CE operating system of MICROSOFT CORPORATION. On a similar note, the user device 104n may comprise web specific devices such as the WEBTV device marketed by PHILIPS ELECTRONICS NV.

Figure 2:
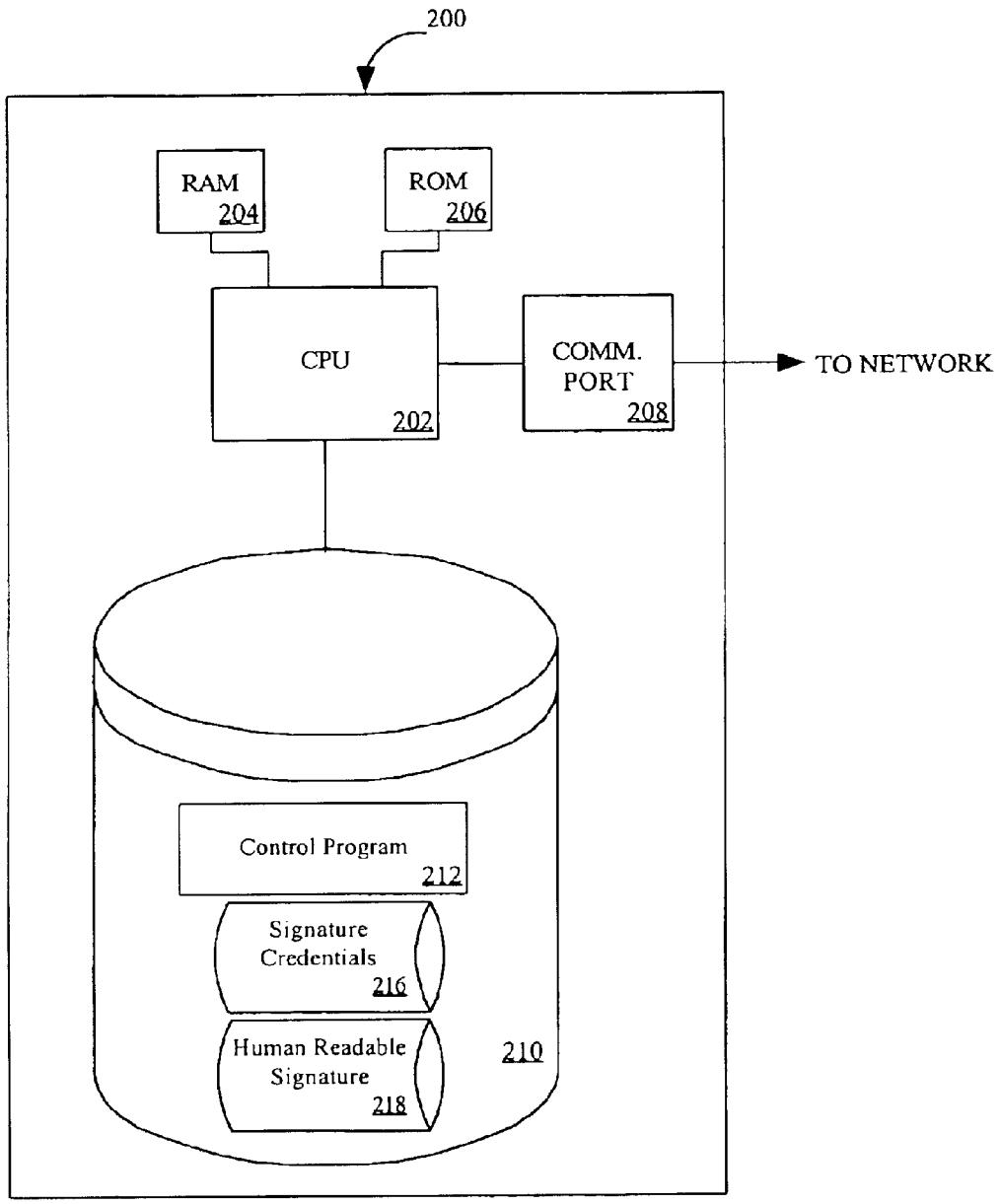
FIG. 2 is a block diagram of a communication device in accordance with the preferred embodiment of the present invention.

FIG. 2 is a block diagram of a user device 200 in accordance with the preferred embodiment of the present invention. The user device 200 (usable as the user device 104n), as shown in FIG. 2, is applicable to a system which exchanges information via e-mail. The user device 200 generally comprises a CPU 202 connected to a RAM 204, a ROM 206, a communications port 208 and a storage unit 210. The CPU 202 generally controls the operation of the user device 200 and may comprise, for example an INTEL PENTIUM Microprocessor or MOTOROLA POWER PC Series Microprocessor. It is also noted that the configuration shown in FIG. 2 is also applicable to a variety of hand held devices where the CPU 202 typically comprises a special purpose microprocessor. The RAM 204 typically stores data required by the processor 202 during operation, including portions of an operating system and any application programs currently being used. The ROM 206, typically stores the BIOS and certain portions of the operating system used by the CPU 202. The communications port 208 enables the service requester device 200 to communicate with the network 100 (not shown) typically via a communications device such as a modem, a network interface card, an ISDN interface device, or a DSL interface device. The network 100 facilitates communications between user devices.

Those of ordinary skill in the art will recognize that the storage device 210 need not be physically co-located with the CPU 202, but may be remotely located, or even part of another computer system entirely, such as on the server 102 (FIG. 1). The storage device 210 can comprise any number of apparatus adapted to store data including hard drives, floppy drives, removable drives, and a variety of other optical storage devices including magneto-optical drives, or CD-Recordable devices. Further, the storage device 210 may be another device accessed via the network 100.

In accordance with the preferred embodiment, the storage unit 210 stores a control program 212, including, for example, an e-mail program which can be selected from any number of available programs, including MICROSOFT'S OUTLOOK, allowing the user device 200 to exchange messages via the network 100. The storage device 210 also stores signature credentials 216 and at least one human readable signature 218. The signature credential 216 and human readable signature 218 are described in detail below and depicted with exemplary entries in the accompanying figures.

Those of ordinary skill in the art will understand that the data storage device 210 further includes additional program elements as needed, such as an operating system and— device drivers—for allowing the CPU 202 to interface with a wide variety of computer peripheral devices. Appropriate device drivers and other necessary program elements are known to those skilled in the art, and need not be described in detail herein.

Figure 3:
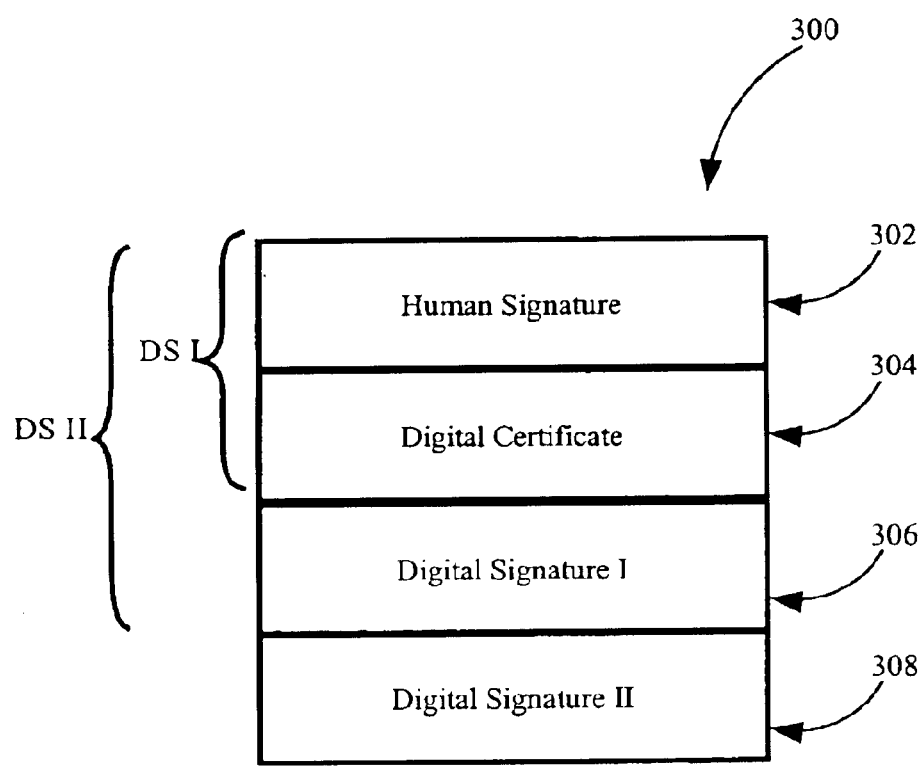
FIG. 3 is a block diagram of a digital signature in accordance with the preferred embodiment of the present invention.

FIG. 3 is a block diagram of a visual digital signature 300 in accordance with the preferred embodiment of the present invention. The visual digital signature 300 is preferably used in addition to a normal digital signature of a document. The visual digital signature 300, in accordance with the preferred embodiment of the present invention, generally comprises a human signature portion 302 with a digital signature I 306. To provide more security a digital certificate 304 is provided by a certifying authority. The certifying authority also provides for a digital signature II 308.

The human signature 302 can be entered and coded in a variety of known ways. A human signature can be scanned or entered directly into a computer using, for example a touch sensitive pad, a mouse, a stylus, or a variety of other mechanisms. The signature can be encoded in GIF, JPEG, WINDOWS Bitmap, or a variety of other known file formats. To provide more versatility, multiple signatures can be entered and stored. Such multiple signatures may include a full signature with full name, a nick name signature, and a set of initials. The human signature 302 is typically stored in the human readable signature file 218, see FIG. 2.

The digital certificate 304 is preferably in accordance with the X.509v1-v3 standard, which is incorporated herein by reference. Digital certificates in accordance with the X.509v1-v3 standard provides for extensions which can be utilized to store the human signature 302. Actually, a X.509v1-v3 digital certificate can act as the shell for the entire data structure shown in FIG. 3.

The digital signature I 306 is the digital signature of the person, typically the sender, whose signature is stored in the human signature 302, also known as the visual certificate bearer. Thus, for example, the digital signature I 306 "signs" the human signature 302 and the digital certificate 304 by encoding the result of a one-way hash on the human signature 302 and the digital certificate 304 with his or her private key. As noted above, the digital signature II 308 is the signature of the certifying authority. Similarly, the digital signature II 308 "signs" the human signature 302, the digital certificate 304, and the digital signature I 306 using the private key of the certifying authority.

Figure 4:
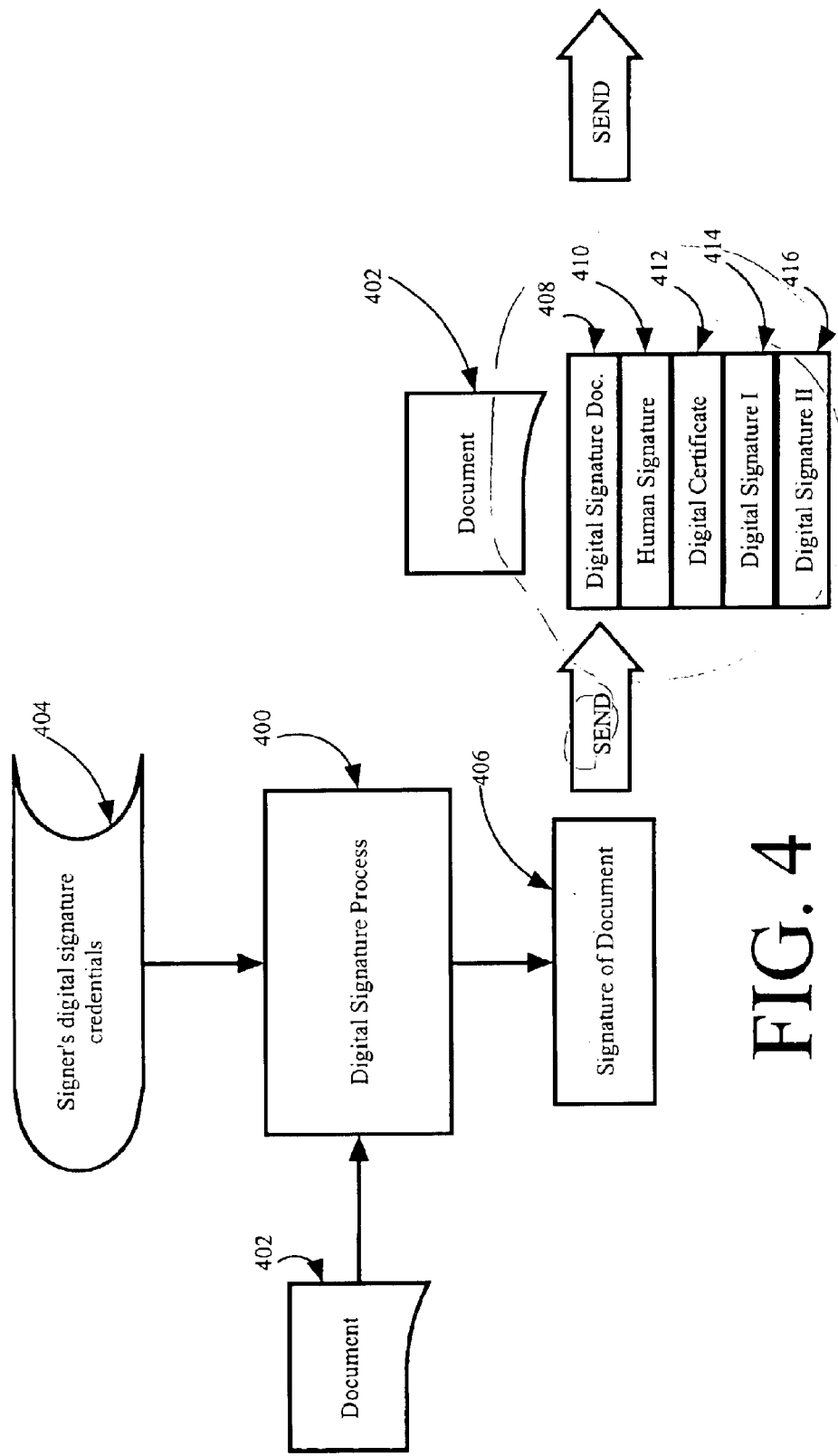
FIG. 4 is a data flow diagram of a method of preparing a digital signature in accordance with the preferred embodiment of the present invention.

FIG. 4 is a data flow diagram of a method of preparing a digital signature in accordance with the preferred embodiment of the present invention. In general, a digital signature process 400 receives a document 402 and a signer's digital signature credentials 404 to produce a signature of document 406. The signature of document 406 is sent with the document to a recipient. The signature of document 406 comprises: a digital signature 408, a human signature 410, a digital certificate 412, a digital signature I 414, and a digital signature II 416.

The digital signature 408 is the hereto before known digital signature with acts as an integrity mechanism and is typically created using a one-way hash function on the contents of the document. The signing, i.e. encryption, is typically performed by encrypting the output of the one-way hash (also called a message digest) with the sender's private key. Those of ordinary skill in the art will recognize that there exist a variety of digital signature mechanisms that can be used. The digital signature 408 is combined with the human signature 410, obtained from a data storage unit or directly input at the time of message creation/transmission. A digital certificate 412 is added, in a known manner, to verify the sender's private key. A digital signature I 414, of the sender, is added, also in a known manner using publically available methods, to "sign" the digital signature 408, the human signature 410 and the digital certificate 412. A digital signature II 416, of the certifying authority, is added (also in a known manner) to "sign" the digital signature 408, the human signature 410, the digital certificate 412 and the digital signature I 414.

Figure 5:
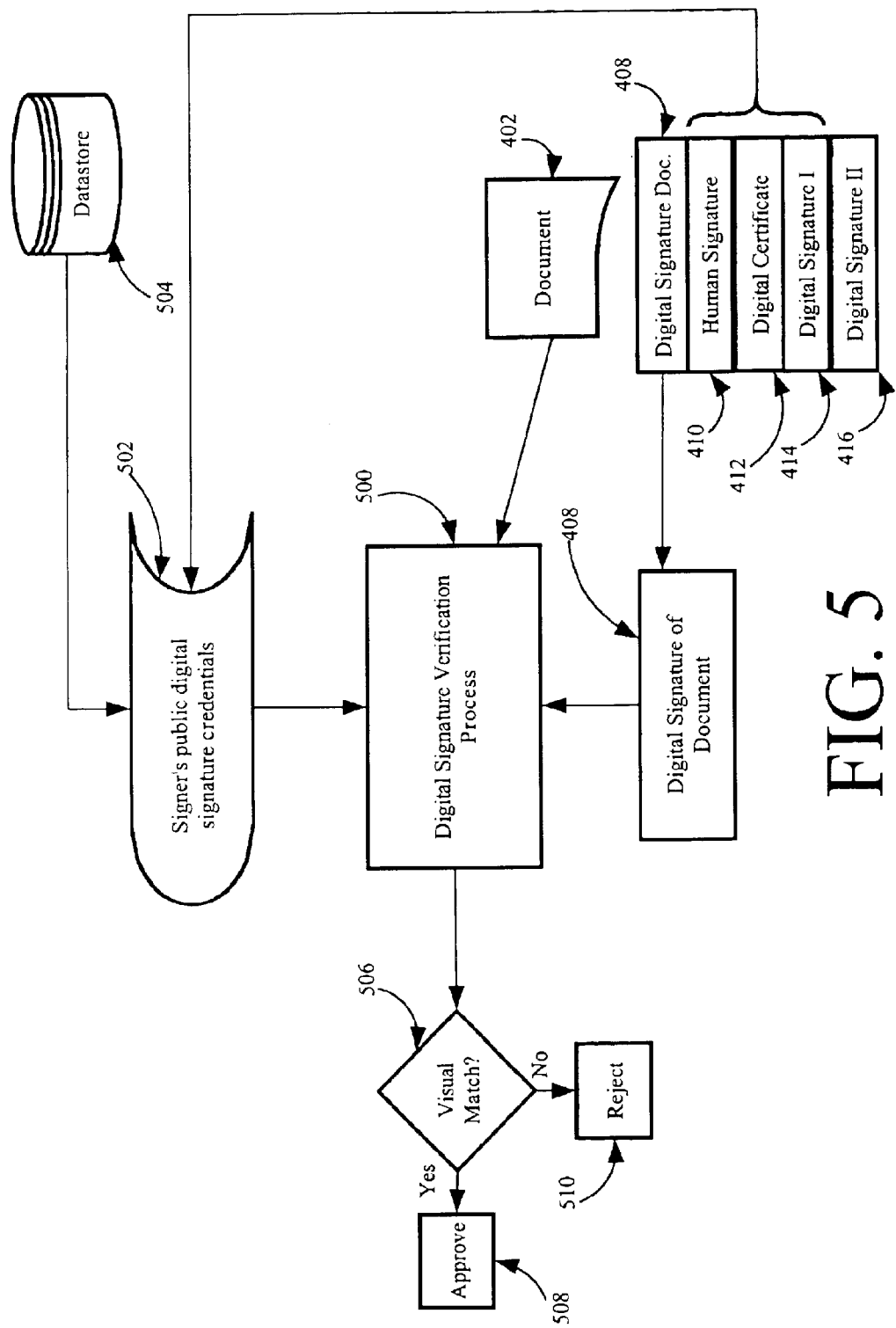
FIG. 5 is a data flow diagram of a method of verifying a digital signature in accordance with the preferred embodiment of the present invention.

FIG. 5 is a data flow diagram of a method of verifying a digital signature in accordance with the preferred embodiment of the present invention. Specifically, FIG. 5 shows the process of verifying the sender's digital signature. To that end, a digital signature verification process receives document 402 and the digital signature of document 406. This process is typically chosen by the format of the digital signature. For example, the process could comprise using the sender's public key to decrypt the digital signature 408 and verify the hash value as against the document.

The human signature 410, the digital certificate 412 and the digital signature 1414 may be analyzed in conjunction with the signer's public digital signature credentials 502 (stored in the datastore 504). For example the data of the human signature 410 may be verified and analyzed against a previously stored version to electronically determine if they match. Such a version can be stored in the datastore 504. Those of ordinary skill in the art will recognize the need for securely storing such signatures and be aware of appropriate measures to that end.

Once the digital signature verification process 500 is satisfied that the various signatures are authentic, it may display the human signature 410 to the message recipient for an additional visual match in step 506. This display can simply show the human signature 410 or it may overlay the human signature 410 over the stored version of the sender's signature. Thus, the recipient is given a visual cue that the received message is believed, by the digital signature verification process 500, to have originated from the sender. The recipient makes a visual inspection of the signature and indicates approval 508 or rejection 510. Alternatively, this visual inspection can occur in parallel with the electronic inspection.

Figure 6:
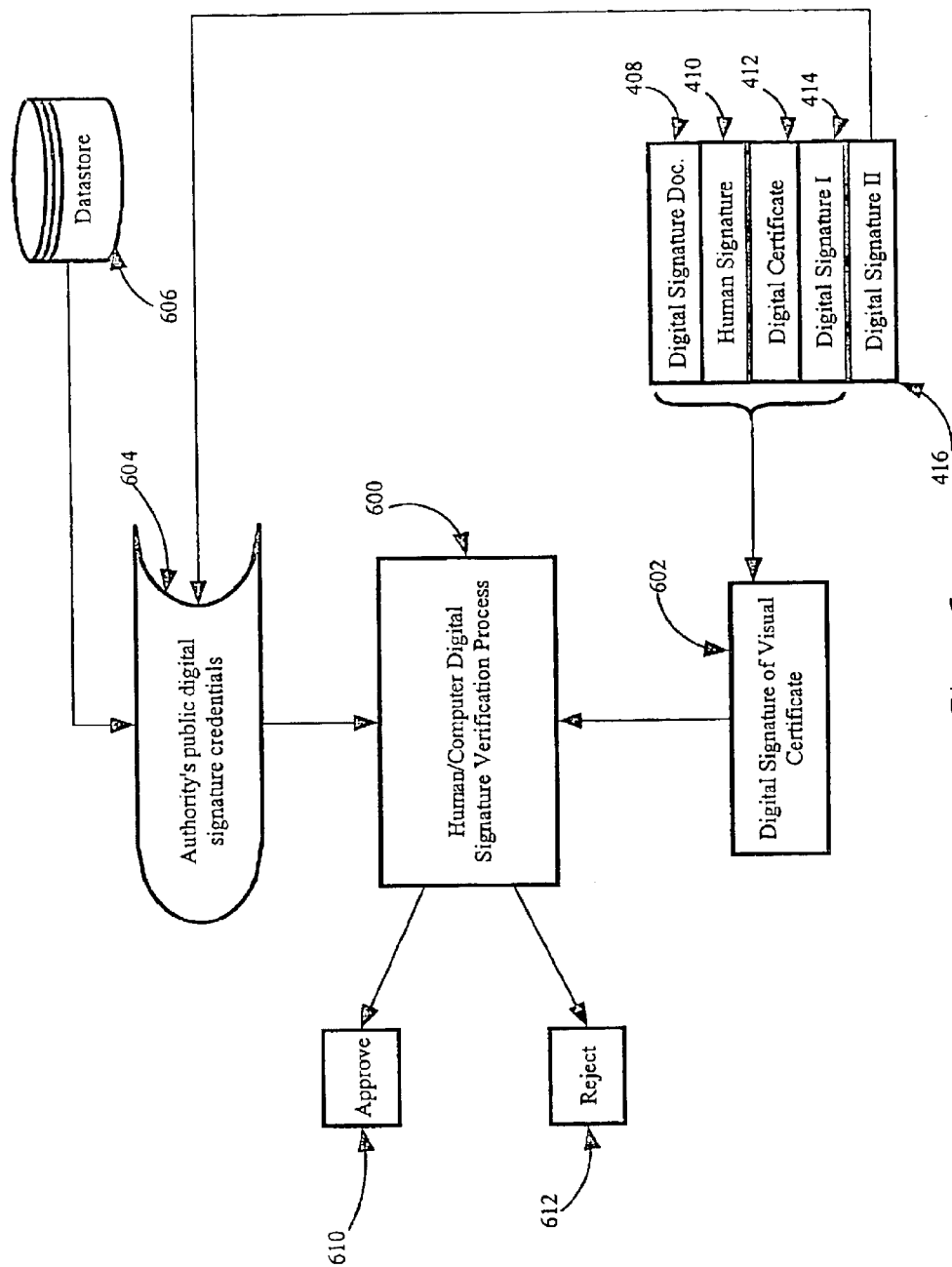
FIG. 6 is a data flow diagram of a method of verifying a digital signature in accordance with the preferred embodiment of the present invention.

FIG. 6 is a data flow diagram of a method of verifying a digital signature in accordance with the preferred embodiment of the present invention. Specifically FIG. 6 shows the data flow for verifying the digital certificate 412, the Digital Signature I 414 of the sender and the Digital Signature II 416 of the certifying authority. In this case a human/computer digital signature verification process 600 receives a digital signature of the visual certificate 602, typically comprising the digital signature I 414 and supporting information including the digital signature 408, the human signature 410 and the digital certificate 412. The digital signature of the visual certificate 602 is analyzed to determine if a match is made and an approval 610 or rejection 612 is issued. The digital signature II may also be analyzed in conjunction with the certifying authority's public digital signature credential 604, typically using previously stored data on a datastore 606.

In accordance with the foregoing, the present inventors have described a method and apparatus for providing mutual non-repudiation of information, such as e-commerce information passed between two parties. This represents a significant advance over the prior art which only provided for a one way non-repudiation.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:

producing a digital signature of a document;

associating a visual digital representation of a signature with the digital signature, the signature being a signature of a person associated with the document;

associating a digital certificate provided by a certifying authority with the visual digital representation of the signature, to thereby sign the visual digital representation of the signature by the certifying authority;

transmitting the document with the digital signature of the document, the visual digital representation of the signature and the digital certificate provided by the certifying authority;

before transmitting the document,
associating a digital signature of the person with the visual digital representation of the signature and the digital certificate provided by the certifying authority, to thereby sign the visual digital representation of the signature and the digital certificate provided by the certifying authority by the person; and, before transmitting the document,
associating a digital signature of the certifying authority with the visual digital representation of the signature, the digital certificate provided by the certifying authority and the digital signature of the person, to thereby sign the visual digital representation of the signature, the digital certificate provided by the certifying authority and the digital signature of the person by the certifying authority, wherein said transmitting transmits the document with the digital signature of the document, the visual digital representation of the signature, the digital certificate provided by the certifying authority, the digital signature of the person and the digital signature of the certifying authority.

2. A method as in claim 1, further comprising:

receiving the transmitted document by a recipient;

authenticating the received document in accordance with the digital signature of the document, the digital certificate provided by the certifying authority, the digital signature of the person and digital signature of the certifying authority; and displaying the visual digital representation of the signature to the recipient.

3. A method as in claim 2, wherein said displaying displays the visual digital representation of the signature to the recipient by overlaying the visual digital representation of the signature over a pre-stored visual digital representation of the signature.

4. A method comprising:

producing a digital signature of a document;

associating a visual digital representation of a signature with the digital signature, the signature being a signature of a person associated with the document;

associating a digital certificate provided by a certifying authority with the visual digital representation of the signature, to thereby sign the visual digital representation of the signature by the certifying authority;

associating a digital signature of the person with the visual digital representation of the signature and the digital certificate provided by the certifying authority, to thereby sign the visual digital representation of the signature and the digital certificate provided by the certifying authority by the person;

associating a digital signature of the certifying authority with the visual digital representation of the signature, the digital certificate provided by the certifying authority and the digital signature of the person, to thereby sign the visual digital representation of the signature, the digital certificate provided by the certifying authority and the digital signature of the person by the certifying authority;

transmitting the document with the digital signature of a document, the visual digital representation of the signature, the digital certificate provided by the certifying authority, the digital signature of the person and the digital signature of the certifying authority, to a recipient;

authenticating the received document in accordance with the digital signature of a document, the digital certificate provided by the certifying authority, the digital signature of the person and the digital signature of the certifying authority; and displaying the visual digital representation of the signature to the recipient by overlaying the visual digital representation of the signature over a pre-stored visual digital representation of the signature.

5. An apparatus comprising:

means for producing a digital signature of a document;

means for associating a visual digital representation of a signature with the digital signature, the signature being a signature of a person associated with the document;

means for associating a digital certificate provided by a certifying authority with the visual digital representation of the signature, to thereby sign the visual digital representation of the signature by the certifying authority;

means for transmitting the document with the digital signature of the document, the visual digital representation of the signature and the digital certificate provided by the certifying authority;

before transmitting the document,
   means for associating a digital signature of the person with the visual digital representation of the signature and the digital certificate provided by the certifying authority, to thereby sign the visual digital representation of the signature and the digital certificate provided by the certifying authority by the person; and, before transmitting the document,
   means for associating a digital signature of the certifying authority with the visual digital representation of the signature, the digital certificate provided by the certifying authority and the digital signature of the person, to thereby sign the visual digital representation of the signature, the digital certificate provided by the certifying authority and the digital signature of the person by the certifying authority,
   wherein said means for transmitting transmits the document with the digital signature of the document, the visual digital representation of the signature, the digital certificate provided by the certifying authority, the digital signature of the person and the digital signature of the certifying authority.

6. An apparatus as in claim 5, further comprising:
   means for receiving the transmitted document by a recipient;
   means for authenticating the received document in accordance with the digital signature of the document, the digital certificate provided by the certifying authority, the digital signature of the person and digital signature of the certifying authority; and
   means for displaying the visual digital representation of the signature to the recipient.

7. An apparatus as in claim 6, wherein said means for displaying displays the visual digital representation of the signature to the recipient by overlaying the visual digital representation of the signature over a pre-stored visual digital representation of the signature.

8. An apparatus comprising:
   means for producing a digital signature of a document;
   means for associating a visual digital representation of a signature with the digital signature, the signature being a signature of a person associated with the document;
   means for associating a digital certificate provided by a certifying authority with the visual digital representation of the signature, to thereby sign the visual digital representation of the signature by the certifying authority;
   means for associating a digital signature of the person with the visual digital representation of the signature and the digital certificate provided by the certifying authority, to thereby sign the visual digital representation of the signature and the digital certificate provided by the certifying authority by the person;
   means for associating a digital signature of the certifying authority with the visual digital representation of the signature, the digital certificate provided by the certifying authority and the digital signature of the person, to thereby sign the visual digital representation of the signature, the digital certificate provided by the certifying authority and the digital signature of the person by the certifying authority;
   means for transmitting the document with the digital signature of a document, the visual digital representation of the signature, the digital certificate provided by the certifying authority, the digital signature of the person and the digital signature of the certifying authority, to a recipient;
   means for authenticating the received document in accordance with the digital signature of a document, the digital certificate provided by the certifying authority, the digital signature of the person and the digital signature of the certifying authority; and
   means for displaying the visual digital representation of the signature to the recipient by overlaying the visual digital representation of the signature over a pre-stored visual digital representation of the signature.

* * * * *

UNITED STATES PATENT AND TRADEMARK OFFICE
CERTIFICATE OF CORRECTION

PATENT NO. : 6,904,524 B1
DATED : June 7, 2005
INVENTOR(S) : William L. Jaeger, Jr. et al.

It is certified that error appears in the above-identified patent and that said Letters Patent is hereby corrected as shown below:

Column 2,
Line 40, after "re-create the" delete "the".

Column 6,
Line 29, delete "with" and insert -- which --.

Column 10,
Line 39, delete "overlying" and insert -- overlaying --.

Signed and Sealed this

Fourteenth Day of February, 2006

JON W. DUDAS
*Director of the United States Patent and Trademark Office*